Figure 8:
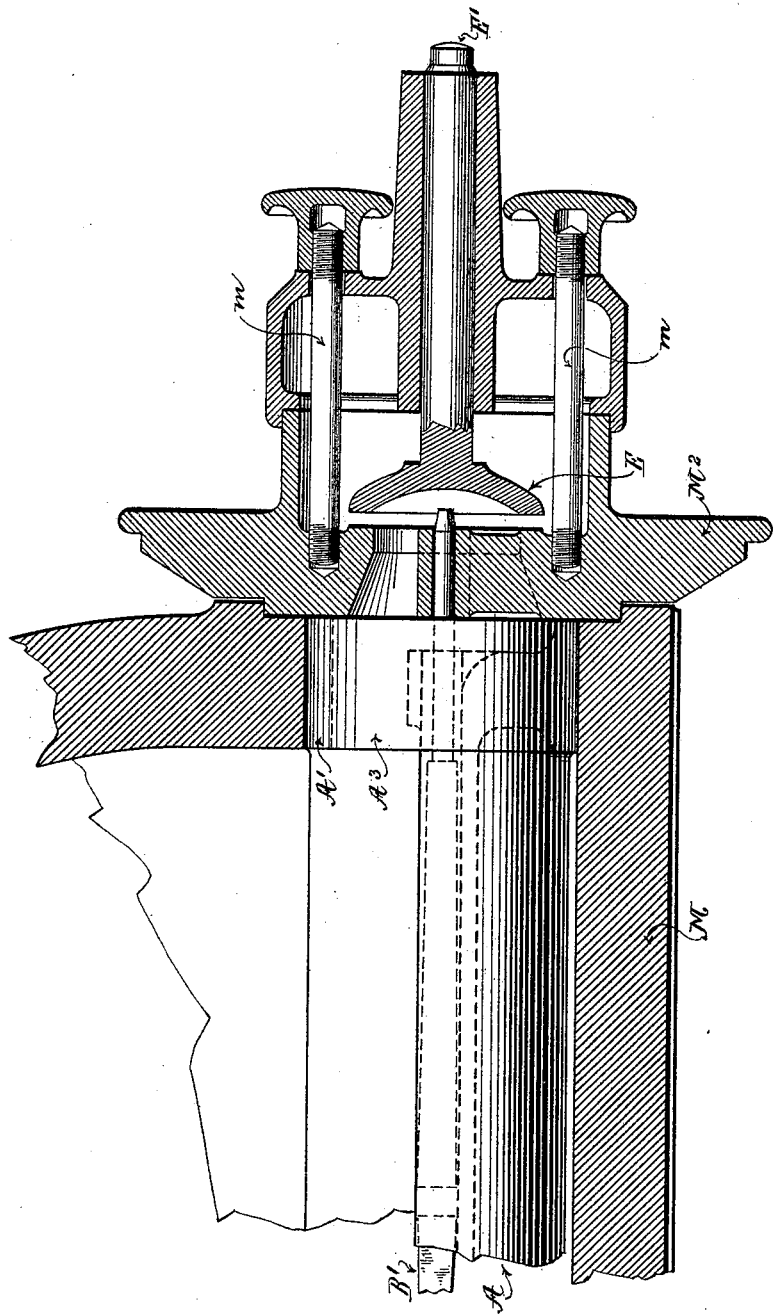

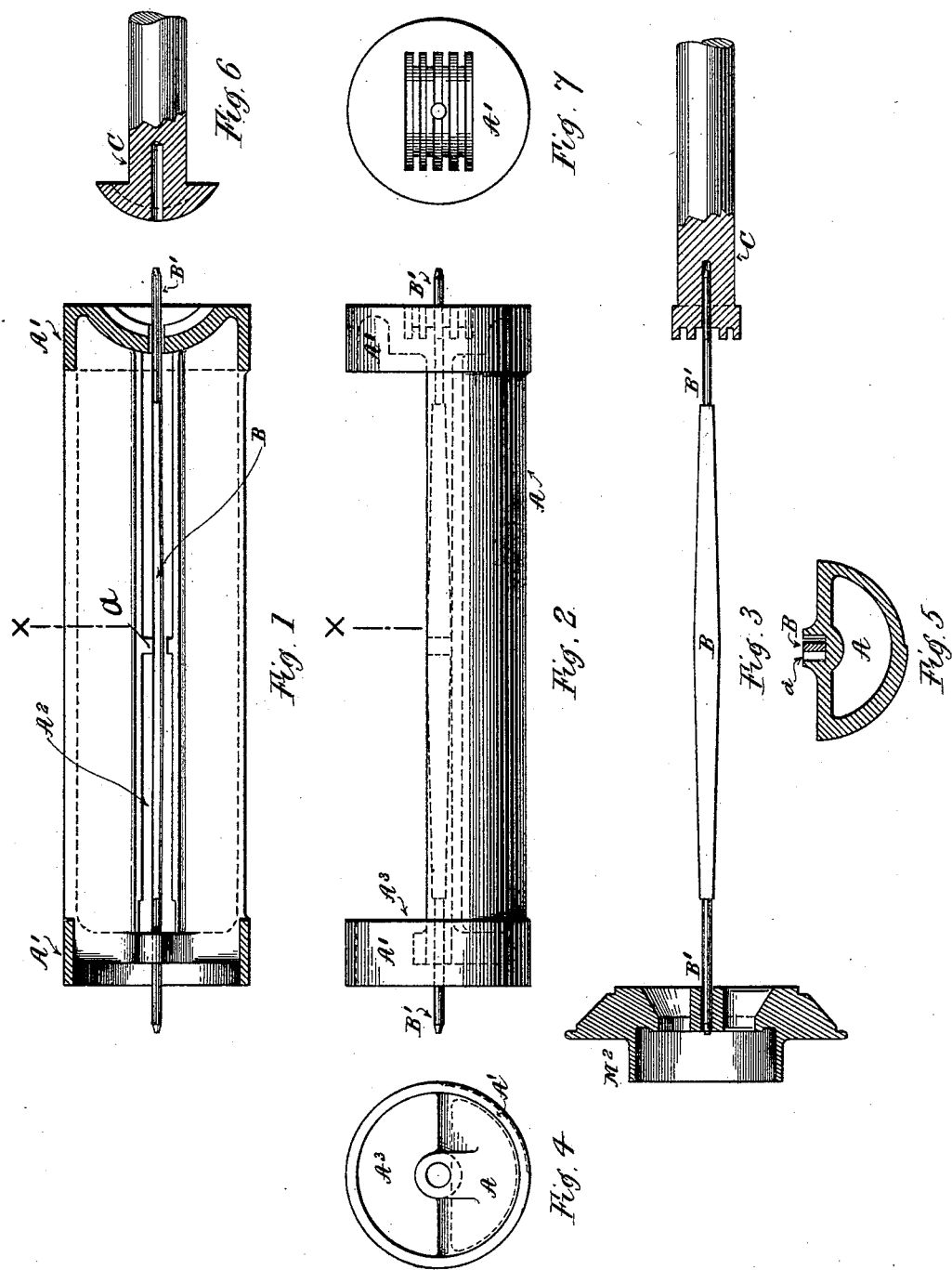

UNITED STATES PATENT OFFICE.

GEORGE H. CORLISS, OF PROVIDENCE, RHODE ISLAND; EMILY A. CORLISS ADMINISTRATRIX OF SAID GEORGE H. CORLISS, DECEASED.

STEAM-ENGINE VALVE.

SPECIFICATION forming part of Letters Patent No. 388,265, dated August 21, 1888.

Application filed February 4, 1888. Serial No. 262,980. (No model.)

*To all whom it may concern:*

Be it known that I, GEORGE H. CORLISS, a citizen of the United States, and a resident of the city and county of Providence, in the State of Rhode Island, have invented certain new and useful Improvements in the Construction of Steam-Engine Valves, of which the following is a specification.

Prior to my present invention I had used rotary slide-valves, and by allowing the steam-valves to lift from their seats against the force of a weight or spring had made provision for relieving the piston of the excessive pressure liable to be brought upon it by the confinement of water, vapor, or steam when the valves are closed and the piston is actuated by the momentum of the fly-wheel. In my present invention I keep the valves close to their seats at all times and construct my valves each with cylindrical ends fitting the bore of the valve-box nearly steam-tight, and I make through one of the ends of each exhaust-valve an opening, through which water or pent-up steam may pass out through an independent relief-valve opening outward from the exhaust-valve box against the force of a weight or spring. I have in another application for Letters Patent set forth a cylinder-relief device with which this open-end form of valve can be advantageously used. I extend the spring through and beyond the valve at each end and journal it outside and independently of the valve and give it a single central bearing-point in the valve, thereby obtaining the full advantage of the entire length of the spring, the office of the spring being to bring the valve in actual contact with the seat at the instant of closing.

In the accompanying drawings, Figure 1 is a top plan, part shown in section. Fig. 2 is an elevation. Fig. 3 is an elevation of the spring with the valve-stem and bonnet shown in section. Fig. 4 is an end view of the open end of the valve. Fig. 5 is a transverse section at $x$ in Fig. 2. Fig. 6 shows a partial section of the valve-stem. Fig. 7 is an end view of the closed end of the valve. Fig. 8 is on a still larger scale. It represents a portion of the exhaust-valve in elevation, with the adjacent parts in vertical section.

Similar letters of reference indicate like parts in all the drawings.

The valve A has cylindrical ends $A'$ $A'$. The valve is cored to form an axial passage, $A^2$, extending entirely through the valve. Midway of this passage $A^2$, I locate a rib, $a$. The valve at one end has parallel concave ridges and grooves adapted to receive corresponding convex ridges and grooves on the end of the valve-stem, similar to the valve-connection covered by my Letters Patent No. 185,855, dated January 2, 1877. In the other end of the valve I leave an opening, $A^3$, to permit the passage of water and pent-up steam through it to relieve the cylinder.

The spring B, having the proper "set," is inserted endwise in the passage $A^2$, with each end projecting beyond the valve. It is journaled entirely outside of the valve and takes a central bearing against the rib $a$ only within the valve. One end of this spring B is journaled in the bonnet $M^2$ $M^2$, bolted upon the exterior of the exhaust-valve box. (Not shown.) The other end of the spring is journaled in the stem C, which is axially bored to receive it. It is not essential that the bearing at this end of the spring be cylindrical, because the stem in which it bears always turns with it, and the only relative motion is the scarcely appreciable one due to the valve being liable to be slightly out of line with the stem. The set of the spring may be attained by cutting the passage through the rib $a$ a little off the center, thereby crowding the spring slightly out of line with the stem.

I claim as my invention and desire to secure by Letters Patent—

1. The valve A, provided with cylindrical ends $A'$ $A'$ and an opening, $A^3$, through one of said ends, in combination with the bonnet $M^2$ and the valve E, opening outward from said valve, so as to promote the passage of fluid outward to relieve the cylinder from undue pressure and to forbid its return, all substantially as herein specified.

2. The valve A, provided with an axial passage, $A^2$, and centrally-located rib $a$, combined with a spring, B, extending through and beyond the valve and being journaled at each end outside and independently of said valve, and having a central bearing against said rib $a$ and at no other point within said valve, all arranged and operating as specified.

3. The valve A, provided with an axial passage, $A^2$, and central rib or bearing, $a$, and a spring, B, extending through and beyond said valve, as shown and described, combined with each other and with a valve-stem, C, and bonnet $M^2$, whereby said spring is journaled at each end entirely outside of and independently of said valve and takes a bearing only at the center of said valve against said rib $a$ to hold the valve upon its seat.

4. The valve-stem C, axially bored, as shown, combined with the valve A and with a spring, B, and adapted to serve, as specified, as a bearing for one end of said spring.

In testimony whereof I have hereunto set my hand, at Providence, Rhode Island, this 3d day of January, 1888, in the presence of two subscribing witnesses.

GEORGE H. CORLISS.

Witnesses:
HENRY MARSH, Jr.,
JAMES TRIBE.